(12) United States Patent
Shiogai et al.

(10) Patent No.: US 9,340,112 B2
(45) Date of Patent: May 17, 2016

(54) CONTROL APPARATUS FOR VEHICLE WITH DIFFERENT DRIVING MODES

(75) Inventors: Akira Shiogai, Wako (JP); Takeshi Taguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 22 days.

(21) Appl. No.: 14/239,486

(22) PCT Filed: Sep. 5, 2012

(86) PCT No.: PCT/JP2012/072537
§ 371 (c)(1),
(2), (4) Date: Feb. 18, 2014

(87) PCT Pub. No.: WO2013/035711
PCT Pub. Date: Mar. 14, 2013

(65) Prior Publication Data
US 2014/0180565 A1    Jun. 26, 2014

(30) Foreign Application Priority Data
Sep. 5, 2011 (JP) ................. 2011-193083

(51) Int. Cl.
*B60L 3/12* (2006.01)
*B60L 11/18* (2006.01)

(52) U.S. Cl.
CPC . *B60L 3/12* (2013.01); *B60L 11/18* (2013.01); *B60L 11/1809* (2013.01); *B60L 11/1881* (2013.01); *B60L 2260/52* (2013.01); *Y02T 10/7072* (2013.01); *Y02T 90/14* (2013.01); *Y02T 90/34* (2013.01)

(58) Field of Classification Search
CPC ....... B60L 3/12; B60L 11/18; B60L 11/1809; B60L 11/1881; B60L 2260/52; Y02T 10/7072; Y02T 90/40; Y02T 90/34
See application file for complete search history.

(56) References Cited

U.S. PATENT DOCUMENTS

| 4,400,779 A | 8/1983 | Kosuge et al. |
| 5,686,895 A | 11/1997 | Nakai et al. |
| 5,734,099 A | 3/1998 | Saigo et al. |

(Continued)

FOREIGN PATENT DOCUMENTS

| JP | 56-140216 A | 11/1981 |
| JP | 58-38726 B2 | 8/1983 |

(Continued)

OTHER PUBLICATIONS

International Search Report dated Nov. 27, 2012 issued in corresponding application No. PCT/JP2012/072537.

*Primary Examiner* — Rami Khatib
*Assistant Examiner* — Jeffrey Boomer
(74) *Attorney, Agent, or Firm* — Westerman, Hattori, Daniels & Adrian, LLP

(57) ABSTRACT

According to a vehicle control apparatus of the invention, at a point in time when a driving mode switching part switches driving modes from any driving mode to another driving mode, a reference energy consumption amount calculation part multiplies a reference energy consumption amount by a driving mode switching coefficient which corresponds to the switching of the driving modes, whereby a reference energy consumption amount is compressed or expanded. An energy consumption rate calculation part calculates an energy consumption rate based on a reference mileage and the reference energy consumption amount.

4 Claims, 9 Drawing Sheets

(56) References Cited

U.S. PATENT DOCUMENTS

| | | |
|---|---|---|
| 7,772,970 B2* | 8/2010 | Masuda et al. ............... 340/439 |
| 8,862,376 B2* | 10/2014 | Yabuta ........................ 701/123 |
| 2007/0247291 A1 | 10/2007 | Masuda et al. |
| 2008/0093136 A1* | 4/2008 | Miller ........................ 180/65.2 |
| 2011/0276206 A1* | 11/2011 | Tofukuji et al. ............... 701/22 |
| 2014/0142836 A1* | 5/2014 | Yabuta ........................ 701/123 |
| 2014/0350764 A1* | 11/2014 | Arai et al. .................... 701/22 |

FOREIGN PATENT DOCUMENTS

| | | |
|---|---|---|
| JP | 8-126103 A | 5/1996 |
| JP | 9-191505 A | 7/1997 |
| JP | 2007-298491 A | 11/2007 |
| JP | 2010-226795 A | 10/2010 |
| JP | 5362760 B2 | 12/2013 |
| WO | 2012/063630 A1 | 5/2012 |

* cited by examiner

CONTROL APPARATUS FOR VEHICLE WITH DIFFERENT DRIVING MODES

TECHNICAL FIELD

The present invention relates to a vehicle control apparatus.

BACKGROUND ART

Conventionally, a technology of calculating an available mileage over which a vehicle can still travel without refilling (an available cruising range) based on a residual amount of fuel has been proposed for a gasoline vehicle which runs on gasoline as fuel (for example, refer to Patent Document 1). The calculated available cruising range is displayed on an instrument panel for the driver to uses it as an index of economical driving or in making a driving plan.

In the technology described Patent Document 1 above, firstly, the fuel consumed and the distance covered by the vehicle are each added up to calculate a fuel consumption rate (fuel economy) which is expressed in units such as miles or kilometers per unit volume of fuel, whereafter an available cruising range is calculated based on the fuel consumption rate and the residual amount of fuel.

RELATED ART DOCUMENT

Patent Document

Patent Document 1: JP-B-58-38726

SUMMARY OF THE INVENTION

Problems to be Solved by the Invention

In recent years, electric vehicles (EV) and hybrid vehicles (HEV) which can run on electric energy stored in a battery as an energy source have been developed. In these vehicles, too, it is possible to calculate an available cruising range by calculating an electric energy consumption rate (distance per unit of electric potential energy) which is expressed in units such as miles or kilometers per unit of electric potential energy of the energy source such as the battery installed on board the vehicle.

Incidentally, the energy consumption rate such as the fuel consumption rate or the electric energy consumption rate changes at all times by being affected by the vehicle speed, the gradient of a road on which the vehicle travels, the operating states of an air conditioner or the like. Additionally, in recent years, vehicles have been developed which can run by selecting one from a plurality of driving modes which have different system output upper limit values as required. However, the energy consumption rate changes depending upon the driving mode selected. It is preferable that the change is reflected from time to time to the available cruising range displayed to such an extent that the driver is prevented from having excessive anxiety or expectation.

In the technology described in Patent Document 1, in order to calculate a fuel economy according to the current vehicle running conditions (an instantaneous fuel economy), the fuel consumed and distance are each cut by half when the added-up value of fuel exceeds a predetermined value. However, in this method, the values of fuel and distance change largely before and after the instant when the added-up value of fuel exceeds the predetermined value, and therefore, there are fears that the extent to which the current running conditions of the vehicle are reflected to the fuel economy changes before and after that instant. Additionally, in Patent Document 1 above, nothing is described on the reflection of the switching of the driving modes or the change in operating states of the air conditioner to the energy consumption rate or the available cruising range, and hence, it is difficult to calculate properly an electric energy consumption rate.

The invention has been made in view of the problem described above, and an object thereof is to provide a control apparatus which can calculate an energy consumption rate which reflects a switching of driving modes between driving modes having different system output upper limit values when the switching of driving modes actually takes places.

Means for Solving the Problems

With a view to achieving the object, according to an invention of claim 1, there is provided a vehicle control apparatus for a vehicle which is driven to run by energy supplied from at least one energy source (for example, a battery 13 in an embodiment which will be described later), including a mileage obtaining part (for example, a mileage obtaining part 31 in the embodiment) which obtains a mileage of the vehicle, a reference mileage calculation part (for example, a reference mileage calculation part 35 in the embodiment) which calculates a reference mileage by adding up the mileage, an energy consumption rate obtaining part (for example, an electricity consumption amount obtaining part 32 in the embodiment) which obtains an energy consumption amount of the vehicle, a reference energy consumption amount calculation part (for example, a reference electricity consumption amount calculation part 36 in the embodiment) which calculates a reference energy consumption amount by adding up the energy consumption amount, an energy consumption rate calculation part (for example, an electricity consumption rate calculation part 37 in the embodiment) which calculates an energy consumption rate based on the reference mileage and the reference energy consumption amount, and a driving mode switching part (for example, a driving mode switching part 41 in the embodiment) which switches a plurality of driving modes which include at least a first driving mode, a second driving mode whose system output upper limit value is set lower than that of the first driving mode, and a third driving mode whose system output upper limit value is set lower than that of the second driving mode, wherein the reference energy consumption amount calculation part compresses or expands the reference energy consumption amount by multiplying the reference energy consumption amount by a driving mode changing coefficient at a point in time when the driving mode switching part switches the plurality of driving modes from any one driving mode to another driving mode.

According to an invention of claim 2, there is provided the vehicle control apparatus according to claim 1, wherein: at a point in time when the reference mileage reaches a predetermined mileage upper limit value, the reference mileage calculation part compresses the reference mileage to a predetermined mileage lower limit value by multiplying the reference mileage by a compression coefficient; and when the reference mileage calculation part compresses the reference mileage, the reference energy consumption amount calculation part compresses the reference energy consumption amount by multiplying the reference energy consumption amount by the compression coefficient.

According to an invention of claim 3, there is provided the vehicle control apparatus according to claim 1 or 2, further including an air conditioner, wherein the reference energy consumption amount calculation part compresses or expands the reference energy consumption amount by multiplying the reference energy consumption amount by an air conditioner operating coefficient which corresponds to a change in operating states of the air conditioner.

According to an invention of claim 4, there is provided the vehicle control apparatus according to any of claims 1 to 3, further including an energy residual amount obtaining part (for example, a battery available capacity obtaining part 38 in the embodiment) which obtains an energy residual amount which can be supplied from the energy source, an available cruising range calculation part (for example, an available cruising range calculation part 39 in the embodiment) which calculates an available cruising range of the vehicle based on the energy residual amount and the energy consumption rate, and a display processing part (for example, an available cruising range display part 50 in the embodiment) which displays the available cruising range at a display part.

According to an invention of claim 5, there is provided an available cruising range display method for a vehicle which is driven to run by energy supplied from at least one energy source and which has at least two driving modes of a first driving mode and a second driving mode by which an energy consumption rate and an available cruising range are improved further than by the first mode, the method including executing at least either of: executing a first instantaneous switching in which a value which is offset in an increasing direction based on an available cruising range in the second driving mode resulting immediately before the switching is referred to as an initial value of the available cruising range of the second driving mode, displaying the initial value after the driving modes are switched to the second driving mode and displaying the available cruising range by changing the available cruising range continuously from the initial value based on a consumed energy in the second driving mode, when the driving modes are switched from the first driving mode to the second driving mode; and executing a second instantaneous switching in which a value which is offset in a decreasing direction based on an available cruising range in the second driving mode resulting immediately before the switching is referred to as an initial value of an available cruising range in the first driving mode, displaying the initial value after the driving mode is switched to the first driving mode and displaying the available cruising range by changing the available cruising range continuously from the initial value based on a consumed energy in the first driving mode, when the driving modes are switched from the second driving mode to the first driving mode, wherein the available cruising range which is displayed after the first or second instantaneous change is executed approaches an available cruising range which is displayed when no instantaneous switching is executed as a mileage increases.

Advantage of the Invention

According to the invention of claim 1, when the driving modes having the different system output upper values are switched therebetween, it is possible to calculate the energy consumption rates which reflect the switches.

According to the invention of claim 2, since the compression process is performed when the reference mileage increases as the vehicle travels, the reference mileage and the reference energy consumption amount can be maintained at constant values. This makes the influence by a change in running conditions constant, whereby it is possible to calculate the energy consumption rate which reflects properly the change in running conditions.

According to the invention of claim 3, when there is a change in operating states of the air conditioner, it is possible to calculate the energy consumption rate which reflects properly the change.

According to the invention of claim 4, it is possible to calculate the available cruising range based on the energy consumption rate which reflects the switching of the driving modes or the change in operating states of the air conditioner. Consequently, since the driver can be let known the influence on the available cruising range by the switching of the driving modes or the change in operating states of the air conditioner in advance, it is possible to enhance the usefulness.

According to the invention of claim 5, since the driver can be let known the influence on the available cruising range by the switching of the driving modes in advance when the driving modes are switched, it is possible to enhance the usefulness.

MODES FOR CARRYING OUT THE INVENTION

Figure 1:
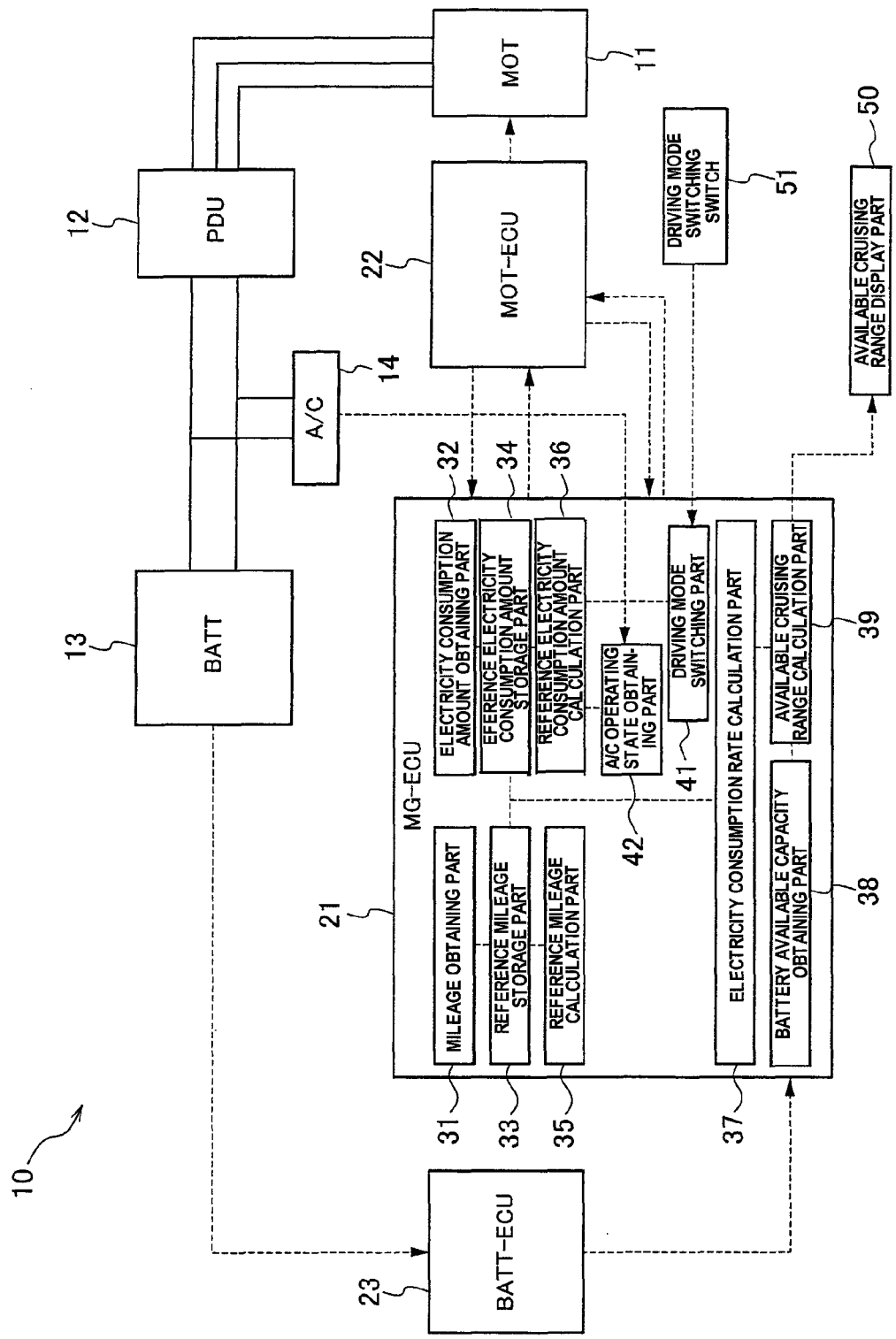
FIG. 1 is a schematic diagram showing the configuration of a control apparatus for an electric vehicle according to an embodiment of the invention.

Hereinafter, an embodiment of the invention will be described based on the accompanying drawings. It is noted that the drawing should be seen in such a way that reference numerals look properly oriented.

FIG. 1 is a schematic diagram which shows an internal configuration of an electric vehicle (EV) in which a control apparatus of this embodiment is installed. An electric vehicle 10 (hereinafter, referred to simply as a "vehicle") shown in FIG. 1 includes a motor generator (hereinafter, referred to simply as a "motor (MOT)") 11, a power drive unit (PDU) 12, a battery (BATT) 13, a management ECU (MG-ECU) 21, a motor ECU (MOT-ECU) 22 and a battery ECU (BATT-ECU) 23.

The motor 11 generates power (torque) by being supplied with three-phase alternating current electric power from the battery 13 via the power drive unit 12. The vehicle runs by the torque generated in the motor 11 being transmitted to drive shafts of driving wheels, not shown. In addition, the motor 11 executes regeneration based on rotations of the driving wheels when the vehicle is decelerated to thereby generate three-phase alternating current electric power.

The power drive unit 12 converts direct current electric power supplied from the battery 13 into three-phase alternating current electric power to thereby drive the motor 11 and converts the three-phase alternating current generated in the motor 11 into direct current electric power to thereby charge the battery 13.

The battery 13 includes a plurality of battery modules which are accommodated within a box while being connected in series with each other and supplies high-voltage electric power. Each battery module includes a plurality of battery cells such as, for example, lithium ion batteries which are connected in series. The battery 13 can be charged with electric power generated in the motor 11 via the power drive unit 12. In addition, the battery 13 also supplies electric power to an air conditioner (A/C) 14.

Information on operations of an ignition switch, not shown, and the air conditioner 14, information from a vehicle speed sensor (not shown) which detects a running speed of the vehicle and information on accelerator opening angle, brake pedal depression amount and the like are inputted into the management ECU 21. The management ECU 21 calculates an output required on the vehicle based on these pieces of information and sends instructions to the motor ECU 22 and the battery ECU 23.

The motor ECU 22 controls the motor 11 according to the instruction from the management ECU 21. Information on electricity amount consumed by the battery 13 (hereinafter, referred to as an electricity consumption amount (unit: Ah)) and information on available capacity (unit: Ah) of the battery 13 are inputted from a current sensor, not shown, into the battery ECU23. These pieces of information are sent to the management ECU 21.

In addition, the management ECU 21 includes a mileage obtaining part 31 which obtains information on mileage from a mileage sensor, not shown, and an electricity consumption amount obtaining part 32 which obtains the electricity consumption amount. Further, the management ECU 21 includes a reference mileage storage part 33, a reference electricity consumption amount storage part 34, a reference mileage calculation part 35, a reference electricity consumption amount calculation part 36, and an electricity consumption rate calculation part 37. Additionally, the management ECU 21 includes a driving mode switching part 41 which switches driving modes based on information inputted from a driving mode switching switch 51 which is provided near, for example, a meter (not shown) and an A/C operating state obtaining part 42 which obtains information on operating states of the air conditioner 14.

The reference mileage storage part 33 stores a mileage obtained by the mileage obtaining part 31. The reference mileage calculation part 35 executes a compression process, which will be described later, and calculates a reference mileage. The reference electricity consumption amount storage part 34 stores the electric capacity consumption amount obtained by the electricity consumption amount obtaining part 32. The reference electricity consumption amount calculation part 36 executes a compression process, which will be described later, and calculates a reference electricity consumption amount. The electricity consumption rate calculation part 37 calculates an electricity consumption rate based on the reference mileage and the reference electricity consumption amount.

Further, the management ECU 21 includes a battery available capacity obtaining part 38 which obtains a currently available capacity of the battery 13. Further, the management ECU 21 includes an available cruising range calculation part 39. The available cruising range calculation part 39 calculates an available cruising range of the vehicle 10 based on the electricity consumption rate and the available capacity of the battery 13. The available cruising range so calculated is displayed, for example, on an available cruising range display part 50 which is provided in a meter (not shown).

The available cruising range calculation part 39 calculates an available cruising range C of the vehicle 10 based on the following expression.

Available cruising range $C$ (km)=electricity consumption rate $R$ (km/Ah)×available capacity $W$ (Ah), where the available cruising range means an available mileage over which the vehicle can still travel on the currently available electric power from the battery 13 in the event that the current running conditions continue. As has been described above, since the available capacity of the battery 13 is obtained in real time by the battery available capacity obtaining part 38, in the event that an electricity consumption rate R which corresponds to the current running conditions can be calculated, it is possible to calculate an available cruising range C which corresponds to the current running conditions.

The electricity consumption rate calculating part 37 calculates an electricity consumption rate R of the vehicle 10 based on the following expression.

Electric consumption rate $R$ (km/Ah)=reference mileage $D$ (km)/reference electricity consumption amount $I$ (Ah)

As has been described above, the reference mileage D and the reference electricity consumption amount I are stored in the reference mileage storage part 33 and the reference electricity consumption amount storage part 34, respectively, and values which are obtained in real time by the mileage obtaining part 31 and the electricity consumption amount obtaining part 32 are added up as required.

Here, when the values of the reference mileage and the reference electricity consumption amount are small, a ratio of the current mileage added and the current electricity consumption amount added to the whole (hereinafter, referred to as a modulus) becomes large, and the influence on the electricity consumption rate and hence the influence on the available cruising range by the current running conditions becomes large. For example, although the electricity consumption amount increases remarkably with respect to the mileage when the vehicle is running on an uphill or the air conditioner is in operation, when the current running conditions influence the available cruising range largely, the available cruising range decreases drastically, leading to fears that the driver gets anxious. When the past running data are deleted sequentially so that only running data immediately before now is used as a base, the fears become particularly intense. In addition, there are fears that a timing which reflects a change in running conditions deviates from an actual timing.

On the other hand, when the values of the reference mileage and the reference electricity consumption amount are small, a ratio of the current mileage and the current electricity consumption amount which are added to the reference mileage and the reference electricity consumption amount, respectively, becomes small, and the influence on the electricity consumption rate and hence on the available cruising range be the current mileage and electricity consumption amount becomes small. As this occurs, the electricity consumption rate and the available cruising range become those which do not reflect a change in the manner in which the driver drives the vehicle and the operating states of the air conditioner.

Then, in this embodiment, a compression process of maintaining the reference mileage which constitutes the base for calculation of the electricity consumption rate at a value which is equal to or larger than Ds and smaller than Dth is executed so that the influences by the current mileage and the current electricity consumption amount become constant. Additionally, in this embodiment, controls to calculate the reference mileage and the reference electricity consumption amount are executed based on the whole running data accumulated up to the current time without deleting any past running data.

Here, in this embodiment, the vehicle 10 is configured so as to run by selecting any of three driving modes of "SPORT," "NORMAL," and "ECON." These three driving modes are set so as to have different upper limit values with respect to an output (hereinafter, also, referred to as a system output) of the battery 13 which is used to run the vehicle 10, as well as driving the air conditioner 14.

Figure 2:
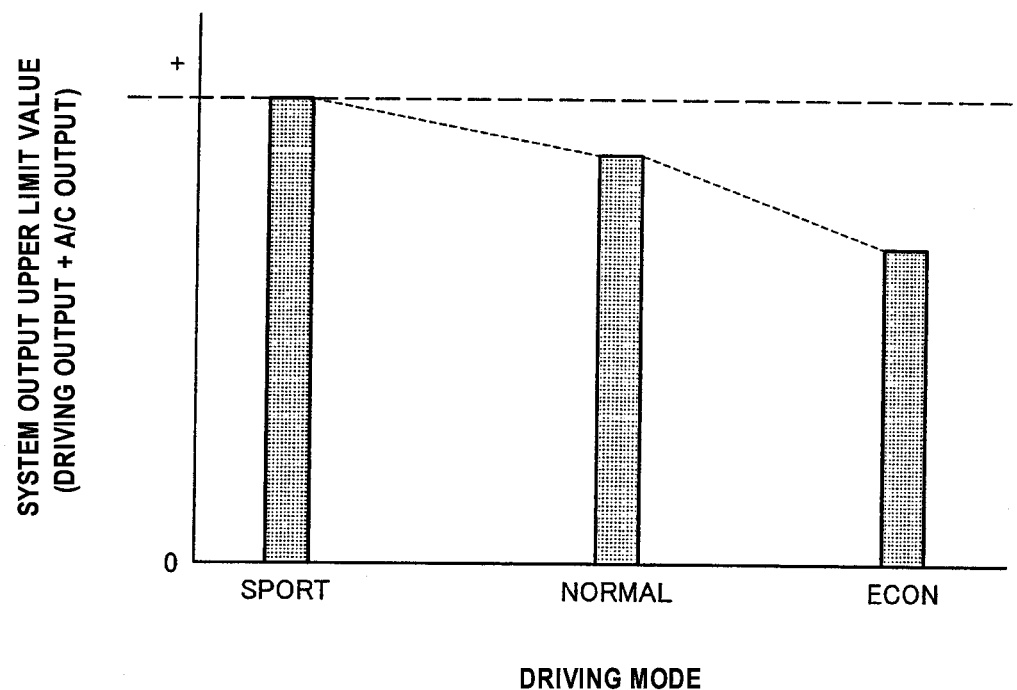
FIG. 2 is a diagram which explains respective upper limit values of system outputs of three driving modes of the electric vehicle according to the embodiment of the invention.

FIG. 2 is a diagram which explains respective system output upper limit values of the three modes of "SPORT," "NORMAL," and "ECON." As shown in FIG. 2, a system output upper limit value of the SPORT mode is set to a value which is substantially the same as a maximum value that the battery 13 can output. By this setting, the running performance of the vehicle 10 in the SPORT mode can be ensured, and therefore, it is possible to realize a powerful running according to the requirement of the driver.

On the other hand, a system output upper limit value of the ECON mode is limited largely. By this setting, a maximum speed of the vehicle 10 is also limited since the output of the motor 11 is limited. However, on the contrary, the electricity consumption rate and available cruising range are improved. In addition, a system output upper limit value of the NORMAL mode is set to take a value which lies between the system output upper limit value of the SPORT mode and the system output upper limit of the ECON mode. In the NORMAL mode, while ensuring a required running performance, both the electricity consumption rate and the available cruising range can be improved to some extent.

In the vehicle 10 of this embodiment, it is configured so that the same driving mode as that used when a vehicle system is deactivated is set to be used when the vehicle system is activated. Thereafter, the driver can switch the driving mode to the driving mode intended by the driver by controlling the driving mode switching switch 51. The information inputted from the driving mode switching switch 51 is sent to the driving mode switching part 41, and the driving mode switching part 41 controls the battery ECU 23, the motor ECU 22 to thereby control the output from the battery 13 and the driving force of the motor 11.

Based on the configuration in which the different driving modes have the different system output upper limits, for example, in the vehicle whose driving modes are switched from the NORMAL mode to the ECON mode, compared with the vehicle which continues to run in the NORMAL mode, it is considered that the electricity consumption rate and the available cruising range are improved. However, when the mileages and the electricity consumption amounts each continue to be added up as they are to calculate an electricity consumption rate and an available cruising range, the effect on the electricity consumption rate and the available cruising range by the switching of the driving modes cannot be indicated to the driver until the vehicle has to run in the switched driving mode to some extent.

Then, in this embodiment, when the driving modes are switched, the reference electricity amount then is expanded or compressed according to the switching of the driving modes. By dosing so, since the electricity consumption rate and the available cruising range change instantaneously in response to the switching of the driving modes, the effect imposed on the electricity consumption rate and the available cruising range by the switching of the driving modes can be indicated to the driver in advance.

Figure 3:
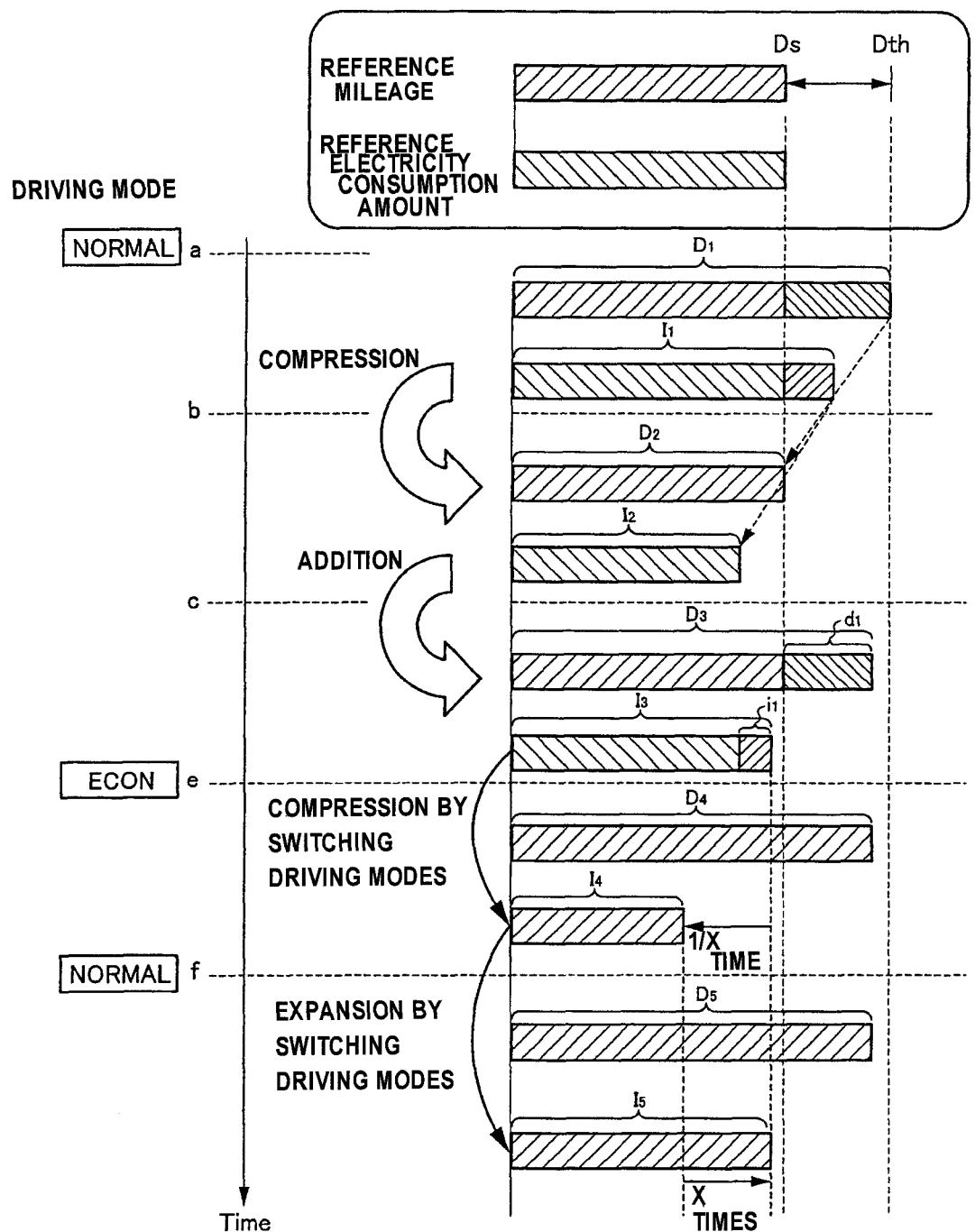
FIG. 3 is a diagram which explains a procedure of calculating a reference mileage and a reference electricity consumption amount in response to a switching of driving modes.
Figure 4:
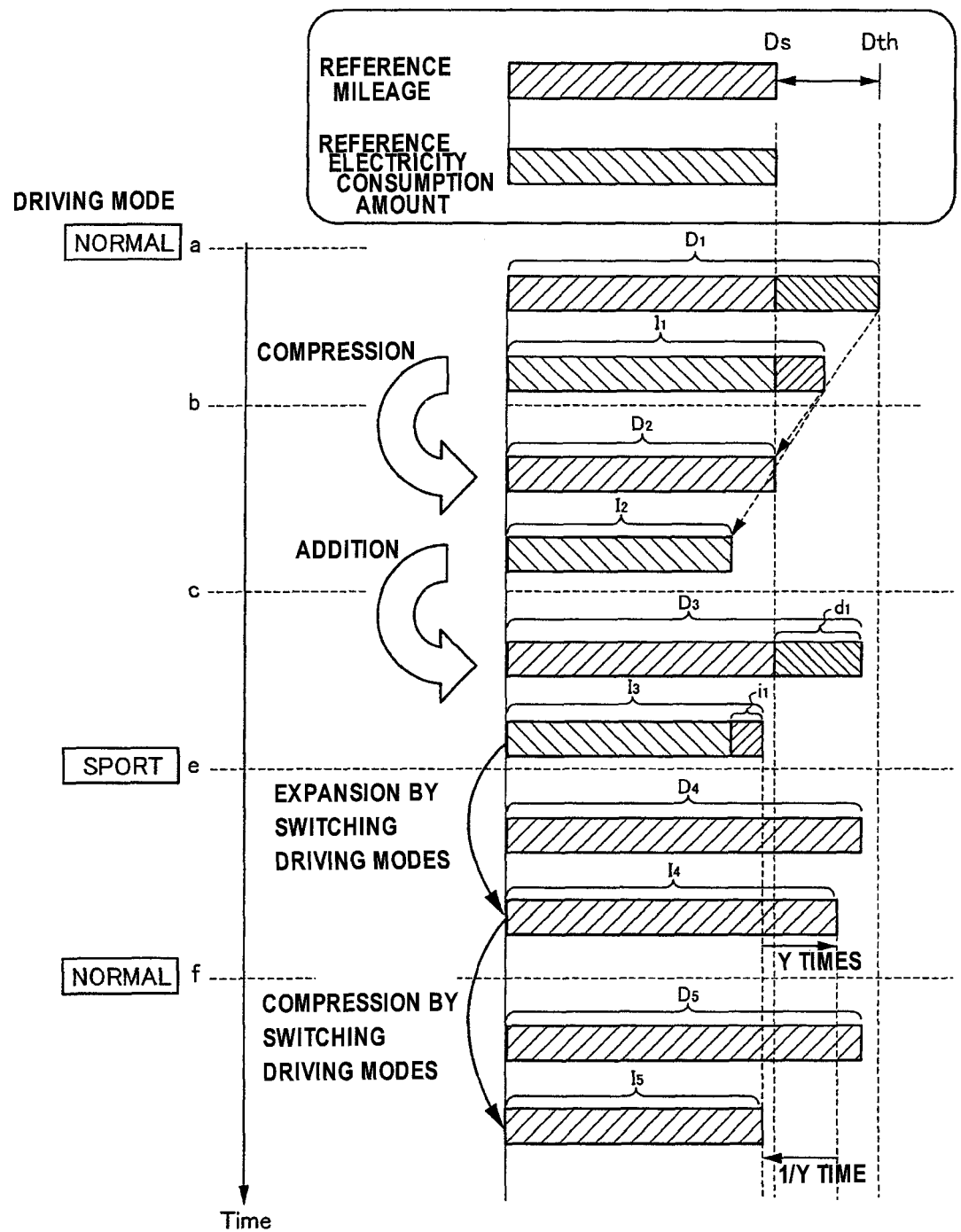
FIG. 4 is a diagram which explains a procedure of calculating a reference mileage and a reference electricity consumption amount in response to a switching of driving modes which is different from the one in FIG. 3.

FIGS. 3, 4 are diagrams which explain procedures of calculating a reference mileage and a reference electricity consumption amount according to the embodiment. In an example shown in FIG. 3, the driving modes of the vehicle are switched from the NORMAL mode to the ECON mode and thereafter are switched back to the NORMAL mode again. Firstly, while the vehicle is running in the NORMAL mode, the reference mileage at a point in time "a" is D1 and has reached a compression threshold Dth. As this occurs, a compression process is executed in which the reference mileage D1 is multiplied by Ds/D1, and the reference mileage D2 at a point in time "b" becomes Ds. On the other hand, the reference electricity consumption amount at the point in time "a" is I1, and similarly, a compression process is executed in which the reference electricity consumption amount is multiplied by Ds/D1, and the reference electricity consumption amount at the point in time "b" becomes I2 (=I1×Ds/D1). Consequently, since D1/I1=D2/I2, the modulus can be held constant while maintaining the electricity consumption rate. Thereafter, as a result of the mileage dl and the electricity consumption amount i1 being each added up, the reference mileage and the reference electricity consumption amount become D3 and I3, respectively.

Thereafter, at a point in time "e," the driving modes are switched from the NORMAL mode to the ECON mode. Here, by multiplying a reference electricity consumption amount I3 at the point in time "e" by a driving mode switching coefficient 1/X (where, X>1) which corresponds to the switching of the driving modes from the NORMAL mode to the ECON mode, the reference electricity consumption amount is compressed. As a result of this, although the reference mileage does not change (D4=D3) before and after the switching of the driving modes, the reference electricity consumption amount becomes 1/X time that before the switching of the driving modes (I4=I3×1/X). Thus, the driver can be let known in advance the possibility of obtaining an advantage that as a result of the switching of the driving modes from the NORMAL mode to the ECON mode, the electricity consumption amount decreases, while the electricity consumption rate increases, and hence the available cruising range increases.

Further, at a point in time "f," the driving modes are switched from the ECON mode to the NORMAL mode. As this occurs, by multiplying the reference electricity consumption amount by a driving mode switching coefficient X which corresponds to the switching of the driving modes from the ECON mode to the NORMAL mode, the reference electricity consumption amount is expanded. As a result of this, although the reference mileage does not change (D5=D4) before and after the switching of the driving modes, the reference electricity consumption amount becomes X times that before the switching of the driving modes (I5=I4×X). Thus, the driver can be let known in advance the possibility of obtaining an advantage that as a result of the switching of the driving modes from the ECON mode to the NORMAL mode, the electricity consumption amount increases, while the electricity consumption rate decreases, and hence the available cruising range decreases.

In addition, in an example shown in FIG. 4, the driving modes of the vehicle are switched from the NORMAL mode to the SPORT mode and thereafter are switched back to the NORMAL mode again. Firstly, while the vehicle is running in the NORMAL mode, the reference mileage at a point in time "a" is D1 and has reached a compression threshold Dth. As this occurs, a compression process is executed in which the reference mileage D1 is multiplied by Ds/D1, and the reference mileage D2 at a point in time "b" becomes Ds. On the other hand, the reference electricity consumption amount at the point in time "a" is I1, and similarly, a compression process is executed in which the reference electricity consumption amount is multiplied by Ds/D1, and the reference electricity consumption amount at the point in time "b" becomes I2 (=I1×Ds/D1). Consequently, since D1/I1=D2/I2, the modulus can be held constant while maintaining the electricity consumption rate. Thereafter, as a result of the mileage d1 and the electricity consumption amount i1 being each added up, the reference mileage and the reference electricity consumption amount at a point in time "c" become D3 and I3, respectively.

Thereafter, at a point in time "e," the driving modes are switched from the NORMAL mode to the SPORT mode. Here, by multiplying a reference electricity consumption amount I3 at the point in time "e" by a driving mode switching coefficient Y (where, Y>1) which corresponds to the switching of the driving modes from the NORMAL mode to the SPORT mode, the reference electricity consumption amount is expanded. As a result of this, although the reference mileage does not change (D4=D3) before and after the switching of the driving modes, the reference electricity consumption amount becomes Y times that before the switching of the driving modes (I4=I3×Y). Thus, the driver can be let known in advance the possibility of obtaining an advantage that as a result of the switching of the driving modes from the NORMAL mode to the SPORT mode, the electricity consumption amount increases, while the electricity consumption rate decreases, and hence the available cruising range decreases.

Further, at a point in time "f," the driving modes are switched from the SPORT mode to the NORMAL mode. As this occurs, by multiplying the reference electricity consumption amount by a driving mode switching coefficient 1/Y which corresponds to the switching of the driving modes from the SPORT mode to the NORMAL mode, the reference electricity consumption amount is compressed. As a result of this, although the reference mileage does not change (D5=D4) before and after the switching of the driving modes, the reference electricity consumption amount becomes 1/Y time that before the switching of the driving modes (I5=I4×1/Y). Thus, the driver can be let known in advance the possibility of obtaining an advantage that as a result of the switching of the driving modes from the SPORT mode to the NORMAL mode, the electricity consumption amount decreases, while the electricity consumption rate increases, and hence the available cruising range increases.

Figure 5:
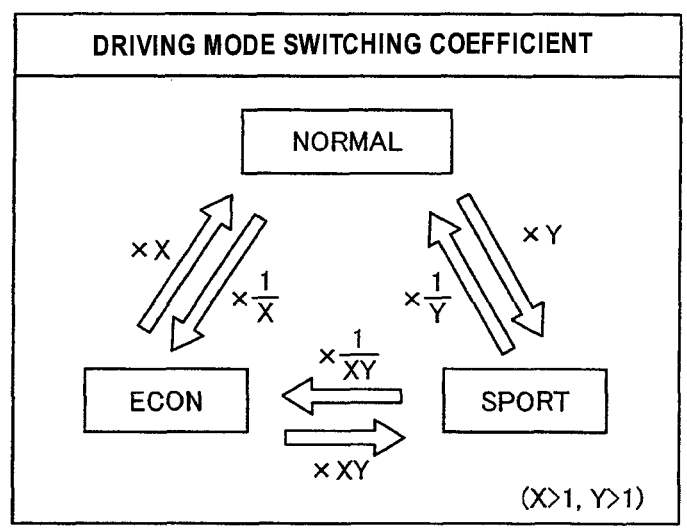
FIG. 5 is a diagram which explains driving mode switching coefficients between three driving modes.

It is noted that although the mileage and the electricity consumption amount are not added up after the driving modes are switched therebetween in FIGS. 3, 4 for the sake of simplification, in the event that running or electricity consumption takes place, it is natural that the adding-up of the values is executed. Additionally, although only the switching of the driving modes between the NORMAL mode and the ECON mode or between the NORMAL mode and the SPORT mode is shown in FIGS. 3, 4, the driving modes may be switched between the ECON mode and the SPORT mode. FIG. 5 shows examples of driving mode switching coefficients which correspond to the switchings between the individual driving modes. As shown in FIG. 5, a driving mode switching coefficient which corresponds to the switching from the ECON mode to the SPORT mode is XY, and a driving mode switching coefficient which corresponds to the switching from the SPORT mode to the ECON mode is 1/XY. These driving mode switching coefficients are determined in advance so as to correspond to the respective system output upper limit values of the driving modes and are stored in a memory or the like, not shown.

Figure 6:
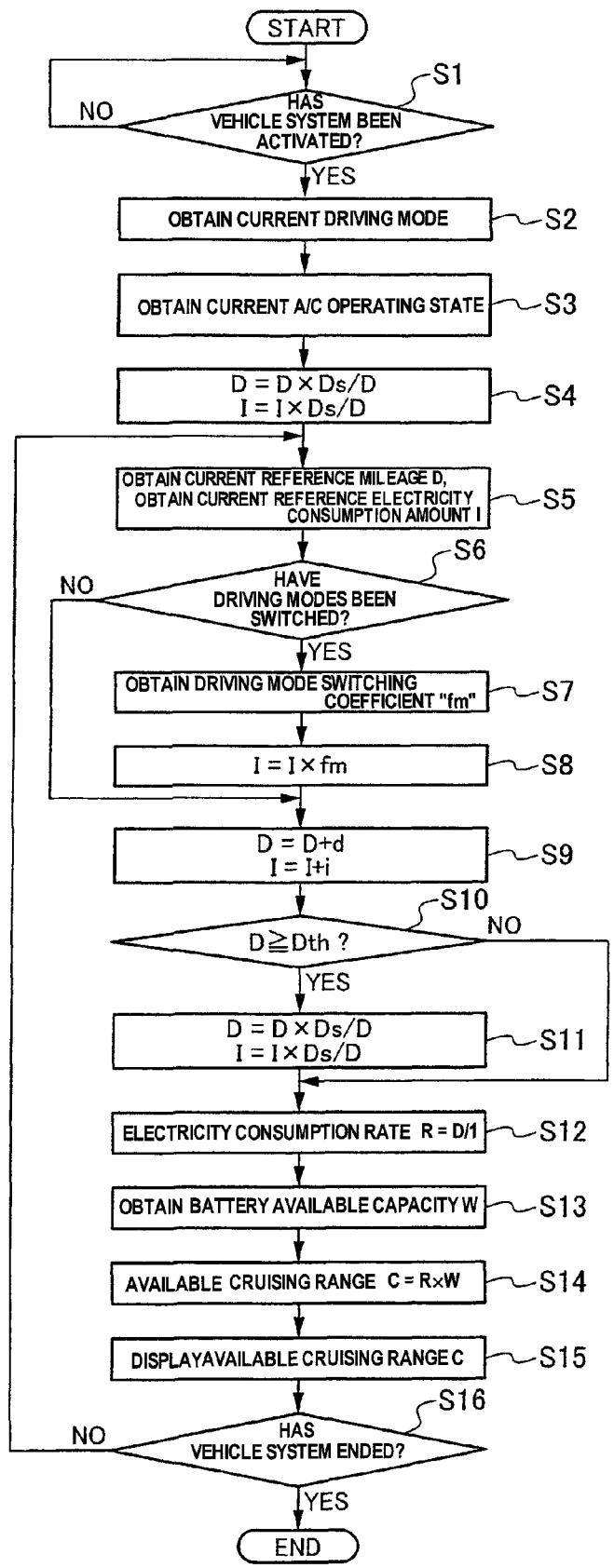
FIG. 6 is a flowchart which shows the operation of the electric vehicle control apparatus according to the embodiment of the invention.

Hereinafter, the operation of the control apparatus according to the embodiment will be described by reference to a flowchart shown in FIG. 6. Firstly, the management ECU 21 determines whether or not the vehicle system has been activated, for example, an ignition switch is on (step S1). If it is determined that the vehicle system has been activated, the driving mode switching part 41 obtains the current driving mode based on information inputted from the driving mode switching switch 51 (step S2). Following this, the reference mileage calculation part 35 obtains the current reference mileage D which is stored in the reference mileage storage part 33, and the reference electricity consumption amount calculation part 36 obtains the current reference electricity amount I (step S3).

Then, the reference mileage calculation part 35 multiplies the current reference mileage D by Ds/D to thereby update the value of the reference mileage D to Ds. Similarly, the reference electricity amount calculation part 36 multiplies the current reference electricity consumption amount I by Ds/D to thereby update the value of the reference electricity consumption amount I (step S4). Then, the mileage obtaining part 31 obtains a mileage "d" since the previous process to the current point in time, and the electricity consumption amount obtaining part 32 obtains an electricity consumption amount i since the previous process to the current point in time (step S5).

Next, the driving mode switching part 41 determines whether or not the driving modes have been switched since the previous process to the current point in time (step S6). If it is determined that the driving modes have not been switched, the flow proceeds directly to step S9.

If it is determined in step S6 that the driving modes have been switched, the reference electricity consumption amount calculation part 36 obtains a driving mode switching coefficient "fm" which corresponds to the contents of the switching of the driving modes by the driving mode switching part 41 from the memory or the like (step S7). Then, the reference electricity consumption amount calculation part 36 multiplies the current reference electricity consumption amount I by the driving mode switching coefficient "fm" to thereby update the value of the reference electricity consumption amount I (step S8).

Next, the reference mileage calculation part 35 adds the mileage "d" to the reference mileage D to thereby update the value of the reference mileage D. Similarly, the reference electricity consumption amount calculation part 36 adds the electricity consumption amount "i" to the current reference electricity consumption amount I to thereby update the value of the reference electricity consumption amount I (step S9).

The reference mileage calculation part 35 determines whether or not the reference mileage D≥the compression threshold Dth (step S10). If it is determined in step S10 that the reference mileage D≥the compression threshold Dth, the reference mileage calculation part 35 multiplies the current reference mileage D by Ds/D to thereby update the value of the reference mileage D to Ds. Similarly, the reference electricity consumption amount calculation part 36 multiplies the current electricity consumption amount I by Ds/D to thereby update the value of the reference electricity consumption amount I (step S11).

If it is not determined in step S10 that the reference mileage D≥the compression threshold Dth, namely, if the reference mileage D<the compression threshold Dth, the electricity consumption rate calculation part 37 divides the reference mileage D by the reference electricity consumption amount I to calculate an electricity consumption rate R (step S12). The battery available capacity obtaining part 38 obtains an available capacity W of the battery 13 (step S13). The available cruising range calculation part 39 multiplies the available capacity W by the electricity consumption rate R to calculate an available cruising range C (step S14). The available cruising range C calculated is displayed on the available cruising range display part 50 (step S15).

The management ECU 21 determines whether or not the vehicle system has ended, that is, whether or not the ignition switch is off (step S16). If it is determined that the vehicle system has not yet ended, the flow returns to step S5. The operation of the control apparatus ends at a point in time when the vehicle system ends.

Figure 7:
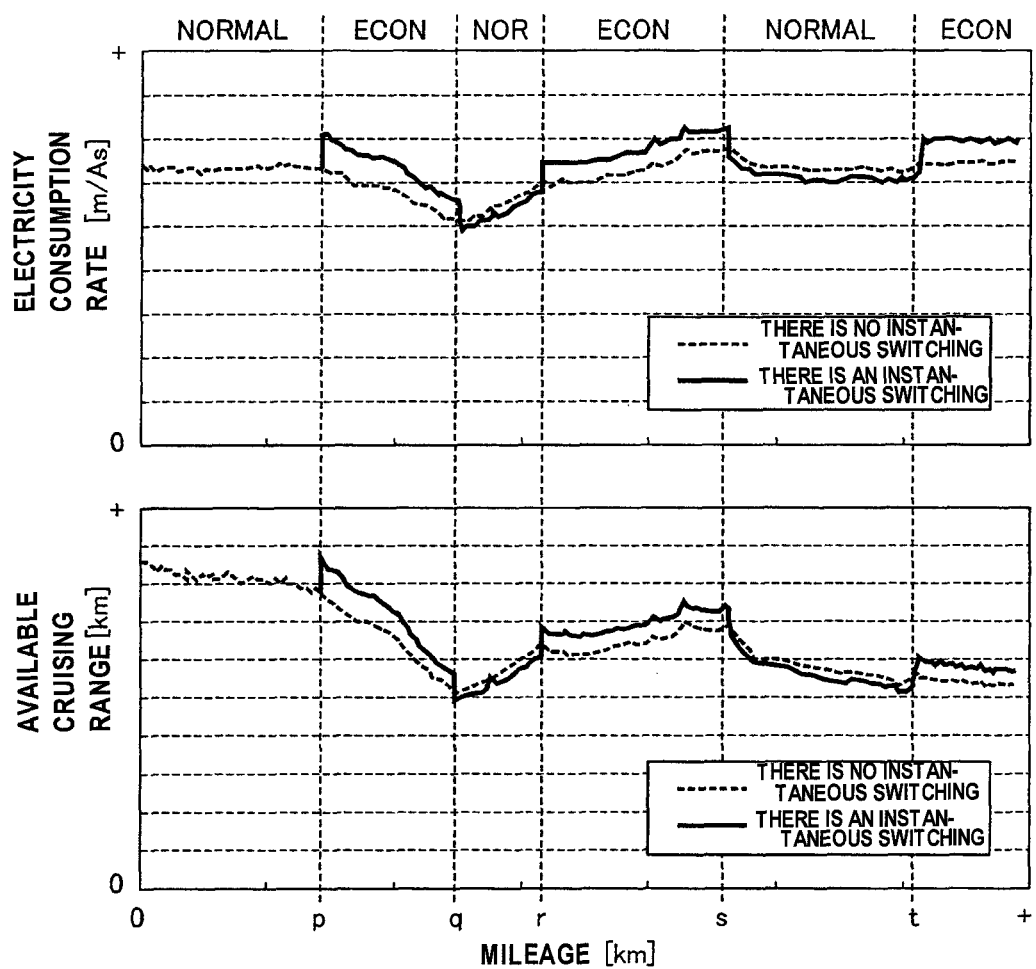
FIG. 7 is a chart which shows an advantage of the control apparatus according to the embodiment of the invention.

FIG. 7 is a chart which shows an advantage of the control apparatus according to the embodiment. In FIG. 7, solid lines denote results of calculations of the electricity consumption rate and the available cruising range in response to the switching of the driving modes between the NORMAL mode and the ECON mode. In FIG. 7, broken lines denote results of calculations of the electricity consumption rate and the available cruising range when an operation is not executed in response to the switching of the driving modes. In FIG. 7, the driving modes are switched from the NORMAL mode to the ECON mode at points in time when the mileage reaches p (km), r (km), t (km). When the electricity consumption amount is compressed at these points in time (the solid lines in FIG. 7), the values of both the electricity consumption rate and the available cruising range are increased to some extent, and it is indicated to the driver that the electricity consumption rate and the available cruising range are enhanced by the switching of the driving modes. On the other hand, the driving modes are switched from the ECON mode to the NORMAL mode at points in time when the mileage reaches q (km), s (km). It is seen that when the electricity consumption amount is expanded at these points in time (the solid lines in FIG. 7), the values of both the electricity consumption rate and the available cruising range are decreased to return to almost the same values which result when the switching of the driving modes is not executed (the broken lines in FIG. 7).

Thus, as has been described heretofore, according to the vehicle control apparatus of this embodiment, since the compression processes are executed when the reference mileage and the reference energy consumption amount increase as the vehicle runs, the reference mileage and the reference energy consumption amount can be held at constant values. This makes it possible to calculate the energy consumption rate which reflects properly the change in running conditions while making the influence by the change in running conditions constant. In addition, when the driving modes are switched between the driving modes having the different system upper limit values, it is possible to calculate the energy consumption rate which reflects properly the switching of the driving modes. Consequently, according to the vehicle control apparatus of this embodiment, since the energy consumption rate which reflects the switching of the driving modes and hence the available cruising range can be indicated to the driver in advance, not only can the usefulness be enhanced, but also the interests of the driver can be satisfied.

Modified Example

In the vehicle 10 described above, as has been described above, the air conditioner 14 is driven to operate by electric power supplied by the battery 13 in response to the activation thereof by the driver or according to the temperature in an interior of a passenger compartment or the like to cool or warm the interior of the passenger compartment. Namely, since the electricity consumption changes depending upon the operating states of the air conditioner 14, the influence imposed on the electricity consumption rate and hence on the available cruising range by a change in operating states of the air conditioner 14 is large. Then, in this modified example, in addition to the execution of compression or expansion of the reference electricity consumption amount in response to the switching of the driving modes, the reference electricity consumption amount is also compressed or expanded according to a change in operating states of the air conditioner 14.

Figure 8:
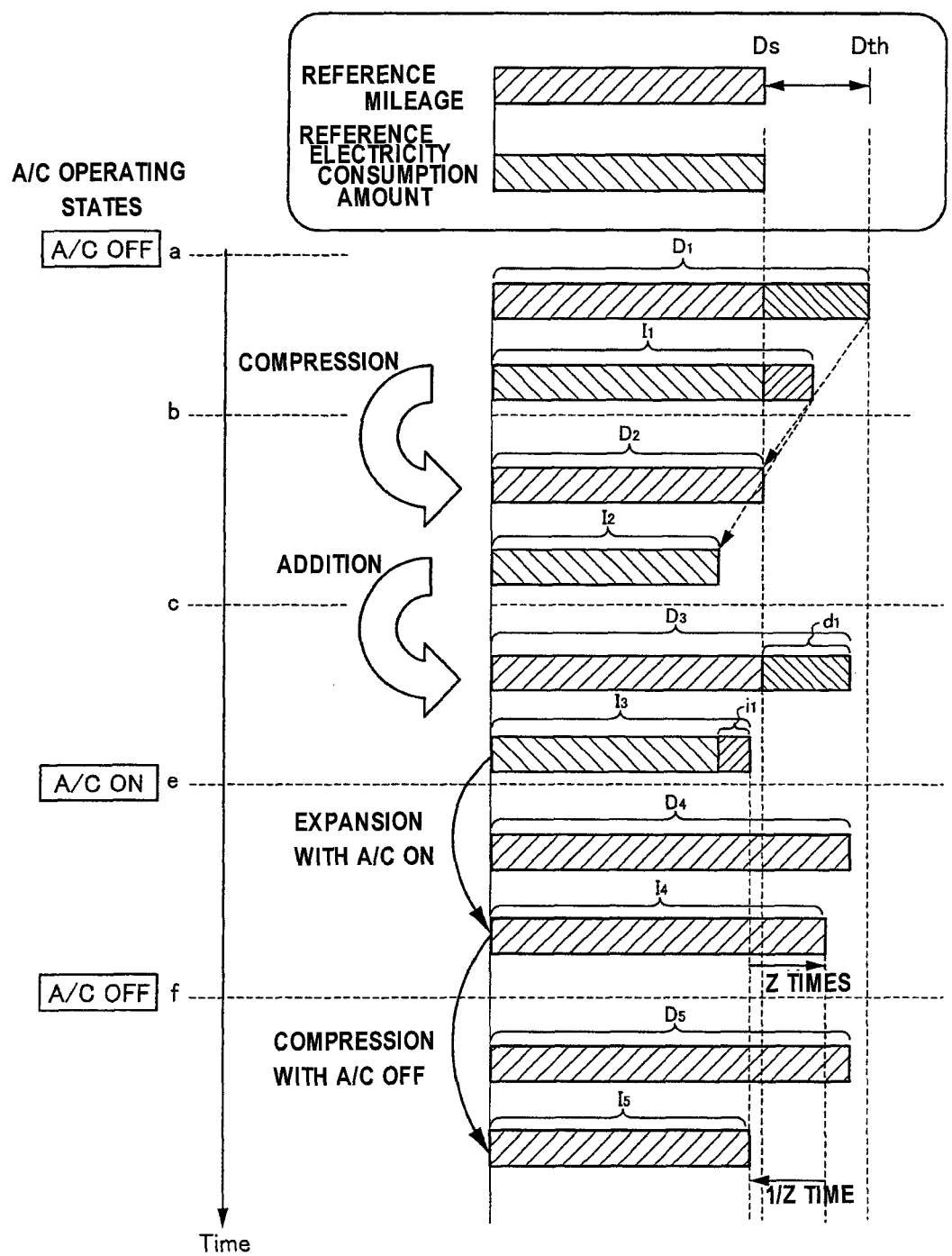
FIG. 8 is a diagram which explains a procedure of calculating a reference mileage and a reference electricity consumption amount according to the operating states of the air conditioner in a modified example of the invention.

FIG. 8 is a diagram which explains a procedure of calculating a reference mileage and a reference electricity consumption amount in the modified example. As shown in FIG. 8, with the air conditioner 14 kept inoperative (A/C OFF) and the vehicle running, the reference mileage at a point in time "a" is D1 and reaches a compression threshold Dth. As this occurs, a compression process is executed in which the reference mileage D1 is multiplied by Ds/D1, and the reference mileage D2 at a point in time "b" becomes Ds. On the other hand, the reference electricity consumption amount at the point in time "a" is I1, and similarly, a compression process is executed in which the reference electricity consumption amount is multiplied by Ds/D1, and the reference electricity consumption amount at the point in time "b" becomes I2 (=I1×Ds/D1). Consequently, D1/I1=D2/I2, and it is possible to maintain the modules constant while the electricity consumption rate is maintained. Thereafter, as a result of a mileage dl and an electricity consumption amount i1 being each added, the reference mileage and the reference electricity consumption amount at a point in time "c" become D3 and I3, respectively.

Thereafter, when the air conditioner 14 is activated to operate (A/C ON) at a point in time "e," the reference electricity consumption amount is expanded by multiplying the reference electricity consumption amount then by an A/C operating state coefficient Z (where, Z>1) which corresponds to a change in operating states of the air conditioner 14 from an inoperative state to an in-operation state. As a result of this, although the reference mileage does not change (D4=D3) before and after the change in operating states of the air conditioner 14, the reference electricity consumption amount becomes Z times that before the change in operating states of the air conditioner 14 (I4=I3×Z). Thus, the driver can be let known in advance the possibility of obtaining an advantage that as a result of the changing in operating states of the air conditioner 14 to the in-operation state, the electricity consumption amount increases, while the electricity consumption rate decreases, and hence the available cruising range decreases.

On the contrary, when the operating states of the air conditioner 14 change from the in-operation state to the inoperative state (A/C OFF) at a point in time "f," the reference electricity consumption amount is compressed by multiplying the reference electricity consumption amount by an A/C operating state coefficient 1/Z which corresponds to a change in operating states of the air conditioner 14 from the in-operation state to the inoperative state. As a result of this, although the reference mileage does not change (D5=D4) before and after the change in operating states of the air conditioner 14, the reference electricity consumption amount becomes 1/Z time that before the change in operating states of the air conditioner 14 (I5=I4×1/Z). Thus, the driver can be let known in advance the possibility of obtaining an advantage that as a result of the changing in operating states of the air conditioner 14 to the inoperative state, the electricity consumption amount decreases, while the electricity consumption rate increases, and hence the available cruising range increases.

It is noted that in FIG. 8, although the driving modes and the switching thereof are omitted for the sake of simplification, in this modified example, it is possible to compress or expand the reference electricity consumption amount in response to both the change in operating states of the air conditioner 14 and the switching of the driving modes. In addition, in FIG. 8, although the reference electricity consumption amount is expanded or compressed in response to the switching of the operating states of the air conditioner 14 between the inoperative state and the in-operation state, the invention is not limited thereto. The reference electricity consumption amount may be expanded or compressed by multiplying the reference electricity consumption amount by an A/C operating state coefficient which corresponds to a change in temperature or airflow rate set on the air conditioner 14. These A/C operating state coefficients are determined in advance based on the performance or the like of the air conditioner 14 and are stored in the memory, not shown.

Figure 9:
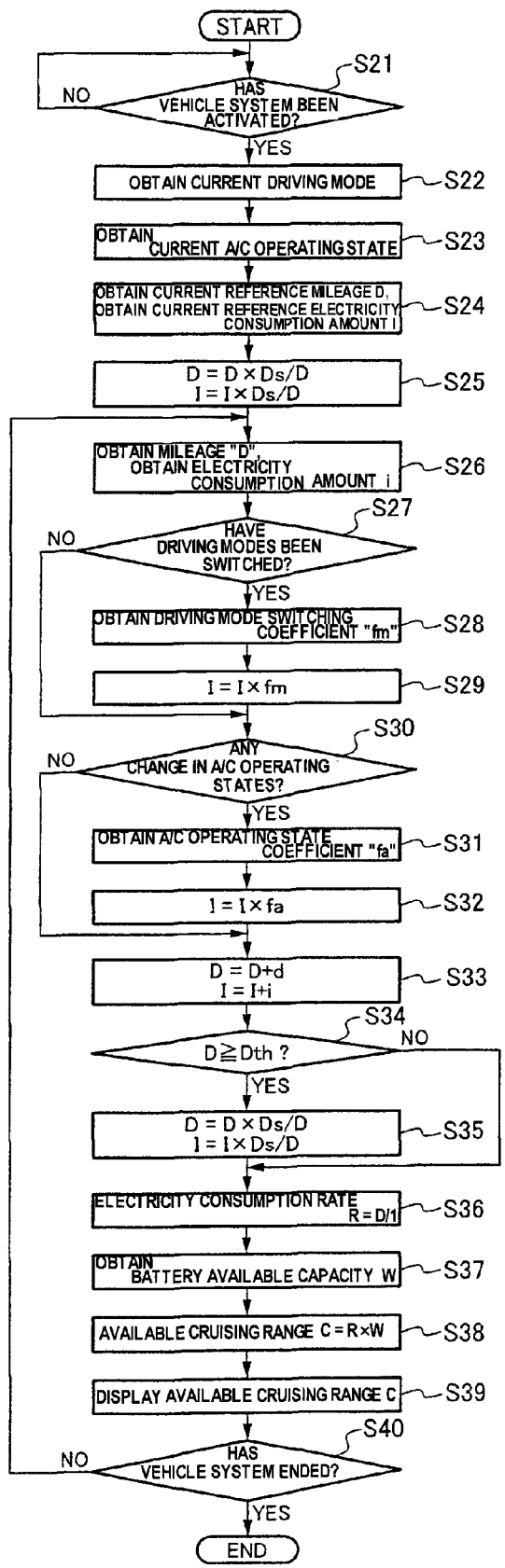
FIG. 9 is a flowchart which shows the operation of an electric vehicle control apparatus according to the modified example of the invention.

Hereinafter, the operation of the control apparatus according to this modified example will be described by reference to a flowchart shown in FIG. 9. Firstly, the management ECU 21 determines whether or not the vehicle system has been activated, for example, whether or not the ignition switch is on (step S21). If it is determined that the vehicle system has been activated, the driving mode switching part 41 obtains the current driving mode based on the information inputted from the driving mode switching switch 51 (step S22), and the A/C operating state obtaining part 42 obtains an operating state of the air conditioner 14 (step S23). Following this, the reference mileage calculation part 35 obtains the current reference mileage D which is stored in the reference mileage storage part 33, and the reference electricity amount calculation part 36 obtains the current reference electricity consumption amount I which is stored in the reference electricity consumption amount storage part 34 (step S24).

Then, the reference mileage calculation part 35 multiplies the current reference mileage D by Ds/D to thereby update the value of the reference mileage D to Ds. Similarly, the reference electricity consumption amount calculation part 36 multiplies the current reference electricity consumption amount I by Ds/D to thereby update the value of the reference electricity consumption amount I (step S25). Then, the mileage obtaining part 31 obtains a mileage "d" since the previous process up to the current point in time, and the electricity consumption amount obtaining part 32 obtains an electricity amount i since the previous process up to the current point in time (step S26).

Next, the driving mode switching part 41 determines whether or not the driving modes have been switched since the previous process up to the current point in time (step S27). If it is determined that the driving modes have not yet been switched, the flow proceeds directly to step S30.

If it is determined in step S27 that the driving modes have been switched, the reference electricity consumption amount calculation part 36 obtains the driving mode switching coefficient "fm" corresponding to the content of the switching of the driving modes by the driving mode switching part 41 which is stored in the memory or the like, not shown (step S28). Then, the driving mode switching part 41 multiplies the current reference electricity consumption amount I by the driving mode switching coefficient "fm" to thereby update the value of the reference electricity consumption mount I (step S29).

Next, the A/C operating state obtaining part 42 determines whether or not there has been a change in operating states of the air conditioner 14 since the previous process up to the current point in time (step S30). If it is determined that there has been no change in operating states of the air conditioner 14, the flow proceeds directly to step S33.

If it is determined in step S30 that there has been a change in operating states of the air conditioner 14, the reference electricity consumption amount calculation part 36 obtains an A/C operating state coefficient "fa" corresponding to the change in operating states of the air conditioner 14 which has been obtained by the A/C operating state obtaining part 42 from the memory or the like, not shown (step S31). Then, the reference electricity consumption amount I is multiplied by the A/C operating state coefficient "fa" to thereby update the value of the reference electricity consumption amount I (step S32).

Next, the reference mileage calculation part 35 adds the mileage "d" to the reference mileage D to update the value of the reference mileage D. Similarly, the reference electricity consumption amount calculation part 36 adds the electricity consumption amount i to the current reference electricity consumption amount I to update the value of the reference electricity consumption amount I (step S33). Operations in the following step S34 to step S40 are similar to those in step S10 to step S16 in FIG. 6, and therefore, the description thereof will be omitted here.

Thus, as has been described heretofore, according to the vehicle control apparatus according to this modified example, when there is a change in operating states of the air conditioner, it is possible to calculate the energy consumption rate which reflects the change. Consequently, since the driver can be let known in advance the energy consumption rate and hence the available cruising range which reflects the change in operating states of the air conditioner and the switching of the driving modes, it is possible to enhance the usefulness.

It is noted that the invention is not limited to the embodiment and the modified example which have been described heretofore and hence that the invention can be modified or improved as required. For example, in each of the embodiments, while the control apparatus according to the invention is installed in the electric vehicle, the control apparatus according to the invention may be applied to an HEV (Hybrid Electric Vehicle) which runs on the driving force of an electric motor and/or a thermal engine according to the running conditions of the vehicle. As this occurs, the HEV may be any of a series HEV in which an internal combustion engine is used only to generate electricity and electric power generated by the driving force of the internal combustion engine is stored in a battery or is supplied to an electric motor, a parallel HEV which runs on the driving force of at least either of an electric motor and an internal combustion engine and a series-parallel HEV in which the series and parallel systems are combined. In addition, the invention can also be applied to a PHEV (Plug-in Hybrid Electric Vehicle), an FCV (Fuel Cell Vehicle), a PFCV (Plug-in Fuel Cell Vehicle) and the like. Additionally, the invention can also be applied to a conventional vehicle which runs by driving a thermal engine such as an internal combustion engine to which fuel such as gasoline is supplied.

In addition, in the embodiment described above, while the compression process is executed in which the value of the reference mileage based on which the electricity consumption rate is calculated is maintained within the predetermined range, a compression process may be executed in which the value of the reference electricity consumption amount based on which the electricity consumption rate is calculated is maintained within a predetermined range. Additionally, in the event that the electricity consumption amount decreases lower than a predetermined value by regeneration, an expansion process may be executed further. In this case, too, by compressing or expanding the reference mileage in response to the change in operating states of the air conditioner and the switching of the driving modes, it is possible to calculate the electricity consumption rate and hence the available cruising range which reflects properly the change and the switching. In addition, the number of driving modes having different system output upper limit values does not have to be three, and hence two or four or more driving modes may be adopted.

This patent application is based on Japanese Patent Application (No. 2011-193083) filed on Sep. 5, 2011, the contents of which are incorporated herein by reference.

Description of Reference Numerals 10 electric vehicle (vehicle);
11 motor;
13 battery;
14 air conditioner (A/C);
21 management ECU;
31 mileage obtaining part;
32 electricity consumption amount obtaining part;
35 reference mileage calculation part;
36 reference electricity consumption amount calculation part;
37 electricity consumption rate obtaining part;
38 battery available capacity obtaining part;
39 available cruising range obtaining part;
41 driving mode switching part;
42 A/C operating state obtaining part;
50 available cruising range display part;
51 driving mode switching switch.

The invention claimed is:

1. A vehicle control apparatus for a vehicle which is driven to run by energy supplied from at least one energy source, comprising:
   a mileage obtaining part which obtains a mileage of the vehicle;
   a reference mileage calculation part which calculates a reference mileage by adding up the mileage;
   an energy consumption amount obtaining part which obtains an energy consumption amount of the vehicle;
   a reference energy consumption amount calculation part which calculates a reference energy consumption amount based on the energy consumption amount;
   an energy consumption rate calculation part which calculates an energy consumption rate based on the reference mileage and the reference energy consumption amount; and
   an available cruising range calculation part which calculates an available cruising range based on the energy consumption rate;
   a driving mode switching device which switches a plurality of driving modes which include at least a first driving mode, a second driving mode whose system output upper limit value is set lower than a system output upper limit value of the first driving mode, and a third driving mode whose system output upper limit value is set lower than that of the second driving mode, wherein
   the reference energy consumption amount calculation part compresses or expands the reference energy consumption amount by multiplying the reference energy consumption amount by a driving mode changing coefficient at a point in time when the driving mode switching part switches the plurality of driving modes from any one driving mode to another driving mode,
   wherein the vehicle control apparatus controls the vehicle in accordance with the system output upper limit of the switched to driving mode,
   wherein the available cruising range calculation part calculates the available cruising range based on the compressed or expanded reference energy consumption amount, and
   wherein the reference energy consumption amount calculation part calculates the reference energy consumption amount by adding the obtained energy consumption amount to an accumulated energy consumption amount.

2. The vehicle control apparatus according to claim 1, wherein:
   at a point in time when the reference mileage reaches a predetermined mileage upper limit value, the reference mileage calculation part compresses the reference mileage to a predetermined mileage lower limit value by multiplying the reference mileage by a compression coefficient; and
   when the reference mileage calculation part compresses the reference mileage, the reference energy consumption amount calculation part compresses the reference energy consumption amount by multiplying the reference energy consumption amount by the compression coefficient;
   wherein the mileage lower limit value and the compressed reference energy consumption amount are larger than 0.

3. The vehicle control apparatus according to claim 1, further comprising:
   an air conditioner, wherein
   the reference energy consumption amount calculation part compresses or expands the reference energy consumption amount by multiplying the reference energy consumption amount by an air conditioner operating coefficient which corresponds to a change in operating states of the air conditioner.

4. The vehicle control apparatus according to claim 1, further comprising:
   an energy residual amount obtaining part which obtains an energy residual amount which can be supplied from the energy source; and
   a display processing part which displays the available cruising range on a display,
   wherein the available cruising range calculation part calculates the available cruising range based on the energy residual amount.

* * * * *